US 12,382,856 B2
Aug. 12, 2025

(12) United States Patent
Anderson

(54) METHOD FOR LOCATING AND PLANTING SENTINEL PLANTS

(71) Applicant: Deere & Company, Moline, IL (US)

(72) Inventor: Noel W. Anderson, Fargo, ND (US)

(73) Assignee: DEERE & COMPANY, Moline, IL (US)

(*) Notice: Subject to any disclaimer, the term of this patent is extended or adjusted under 35 U.S.C. 154(b) by 186 days.

(21) Appl. No.: 17/823,576

(22) Filed: Aug. 31, 2022

(65) Prior Publication Data
US 2024/0065138 A1 Feb. 29, 2024

(51) Int. Cl.
A01C 14/00 (2006.01)
A01B 69/04 (2006.01)
A01C 5/04 (2006.01)
G05D 1/00 (2024.01)

(52) U.S. Cl.
CPC ............ *A01C 14/00* (2013.01); *A01B 69/008* (2013.01); *A01C 5/04* (2013.01); *G05D 1/0094* (2013.01)

(58) Field of Classification Search
CPC ...................................................... A01C 14/00
See application file for complete search history.

(56) References Cited

U.S. PATENT DOCUMENTS

| 8,063,774 | B2 | 11/2011 | Anderson | |
|---|---|---|---|---|
| 10,068,354 | B2* | 9/2018 | Mentzer | G06T 11/00 |
| 10,986,827 | B2 | 4/2021 | Aronov et al. | |
| 11,445,657 | B2 | 9/2022 | Moiddin et al. | |
| 11,818,977 | B2 | 11/2023 | Anderson et al. | |
| 2015/0187109 | A1* | 7/2015 | Mentzer | G06T 11/00 345/632 |
| 2018/0092295 | A1* | 4/2018 | Sugumaran | A01C 14/00 |
| 2020/0200683 | A1 | 6/2020 | Aronov et al. | |
| 2020/0240841 | A1* | 7/2020 | McQuilkin | A61B 5/0075 |
| 2020/0242754 | A1* | 7/2020 | Peters | G06T 7/0004 |

(Continued)

FOREIGN PATENT DOCUMENTS

| BR | 112021012307 A2 | 9/2021 |
|---|---|---|
| BR | 112021025653 A2 | 2/2022 |

(Continued)

OTHER PUBLICATIONS

German Search Report issued in application No. DE102023120252.9 dated Dec. 20, 2023 (07 pages).

(Continued)

*Primary Examiner* — Jean Paul Cass

(57) ABSTRACT

A planter configured for planting a sentinel plant in a field. The planter comprises a first planting system that is coupled to the planter. The first planting system is configured for planting a first sentinel plant having a first sentinel plant characteristic. A global positioning system is communicatively coupled to the planter. The global positioning system is configured for generating a location signal indicative of a location of the planter. A control system is communicatively coupled to the planter. The control system is configured to receive the first sentinel plant characteristic, receive the location signal, receive a georeferenced field characteristic, and control the first planting system based on at least one of the first sentinel plant characteristic, the location, or the georeferenced field characteristic.

14 Claims, 7 Drawing Sheets

(56) References Cited

U.S. PATENT DOCUMENTS

| | | | | |
|---|---|---|---|---|
| 2020/0396976 A1* | 12/2020 | Aronov | ............... | A01N 63/14 |
| 2021/0015025 A1* | 1/2021 | Moiddin | ............... | A01C 5/04 |
| 2021/0235682 A1 | 8/2021 | Aronov et al. | | |
| 2022/0003677 A1 | 1/2022 | Aronov et al. | | |
| 2022/0124966 A1 | 4/2022 | Barker | | |
| 2022/0151215 A1* | 5/2022 | Aronov | ............... | A01G 7/00 |

FOREIGN PATENT DOCUMENTS

| | | | | | |
|---|---|---|---|---|---|
| CA | 3124561 | A1 | | 6/2020 | |
| CA | 3144077 | A1 | | 12/2020 | |
| CN | 206200429 | U | | 5/2017 | |
| CN | 207200508 | U | | 4/2018 | |
| CN | 113243012 | A | * | 8/2021 | ............ A01G 25/16 |
| CN | 113490746 | A | | 10/2021 | |
| CN | 114207672 | A | | 3/2022 | |
| CN | 117208742 | A | * | 12/2023 | |
| DE | 102021211505 | A1 | | 6/2022 | |
| EP | 3897107 | A2 | | 10/2021 | |
| EP | 3987437 | A1 | | 4/2022 | |
| WO | WO2020132364 | A2 | | 6/2020 | |
| WO | WO2020132364 | A3 | | 7/2020 | |
| WO | WO2020257791 | A1 | | 12/2020 | |

OTHER PUBLICATIONS

Innerplant, Seeding the future, pp. 1-14, [online]. Retrieved from the Internet <URL: https://innerplant.com/>.

Rodríguez et al., Genetic regulation of cold-induced albinism in the maize inbred line A661, Jun. 2, 2013, pp. 3657-3667, Journal of Experimental Botany, vol. 64, No. 12, doi: 10.1093/jxb/ert189, [online]. Retrieved from the Internet <URL: https://www.researchgate.net/figure/The-maize-inbred-line-A661-shows-a-cold-induced-albino-phenotype-A-Detail-of-B73-and_fig1_251568982> and <https://digital.csic.es/bitstream/10261/82204/3/genetic_regulation_Rodriguez.pdf>.

Irani et al., Light-induced morphological alteration in anthocyanin-accumulating vacuoles of maize cells, BMC Plant Biology Research article, May 20, 2005, pp. 1-15, [online]. Retrieved from the Internet <URL: https://bmcplantbiol.biomedcentral.com/articles/10.1186/1471-2229-5-7>.

Cropnuts, Nutrient Deficiency Guide For Crops, pp. 1-16, [online]. Retrieved from the Internet <URL: https://cropnuts.com/plant-nutrient-deficiency-symptom-guide-for-crops/>.

Pinterest, Deficiency Chart of Micronutrients, [online]. Retrieved from the Internet <URL: https://www.pinterest.com/pin/205969382935100929/>.

Fine Gardening, Some flowers can change color, pp. 1-14, [online]. Retrieved from the Internet <URL: https://www.finegardening.com/article/qa-some-flowers-can-change-color>.

Hosier et al., Guide to Symptoms of Plant Nutrient Deficiencies, May 1999, pp. 1-3, [online]. Retrieved from the Internet <URL: https://extension.arizona.edu/sites/extension.arizona.edu/files/pubs/az1106.pdf>.

Albinism in Wheat, pp. 1-2, [online]. Retrieved from the Internet <URL: https://s3-us-west-2.amazonaws.com/smallgrains.wsu.edu/uploads/2014/04/Albinism-in-Wheat-Richard-Smiley.pdf>.

* cited by examiner

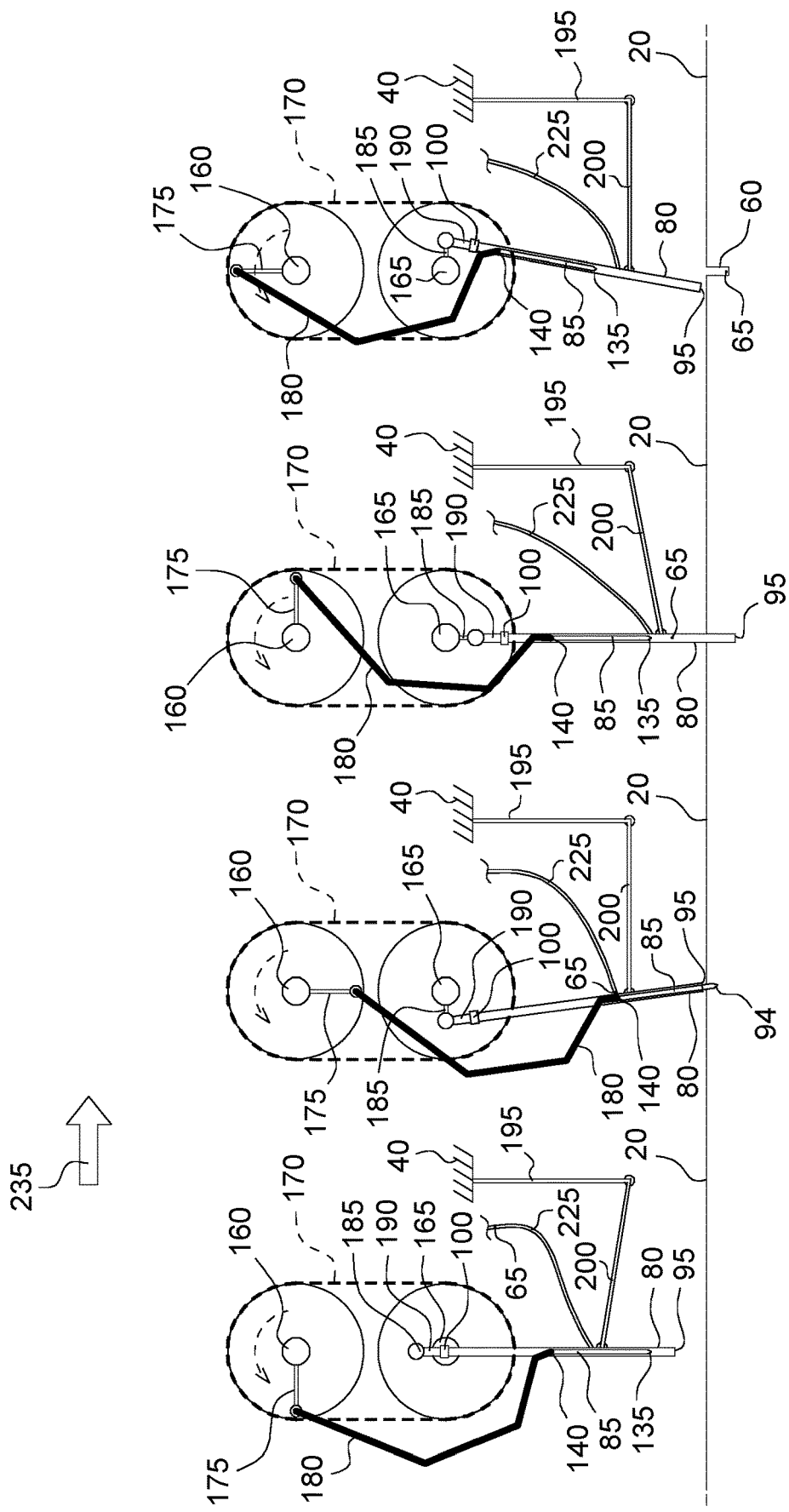

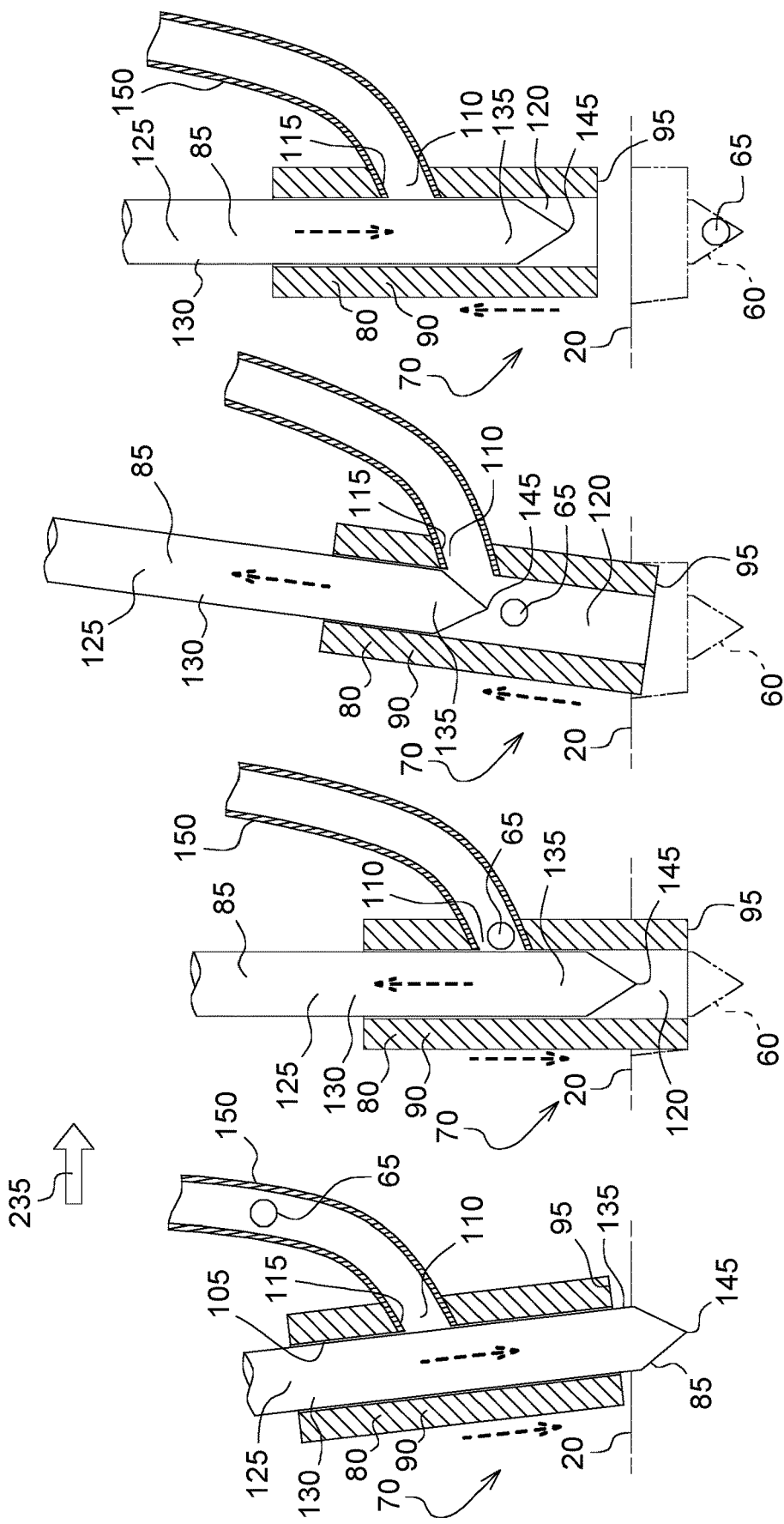

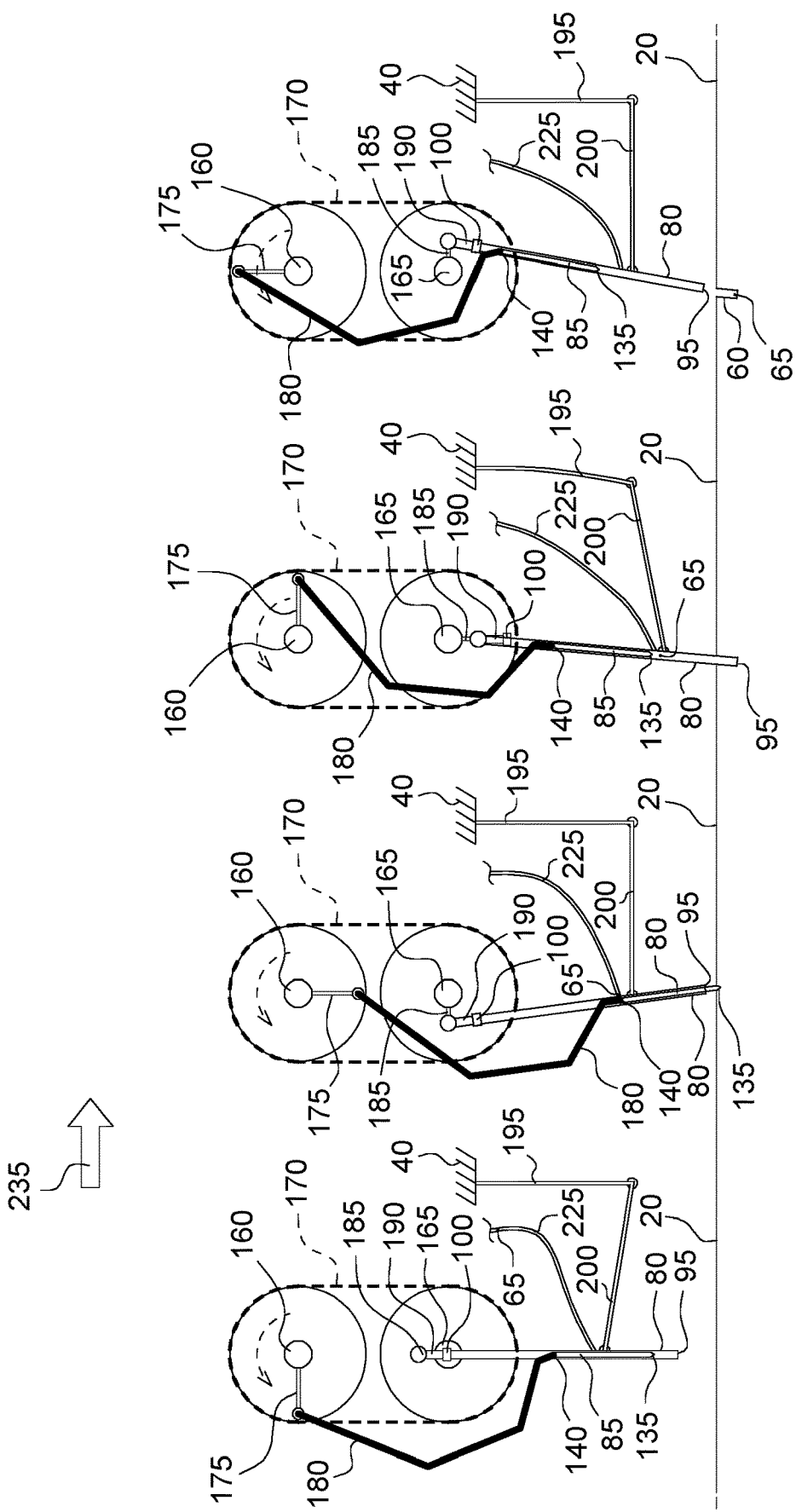

METHOD FOR LOCATING AND PLANTING SENTINEL PLANTS

FIELD OF THE DISCLOSURE

The present disclosure generally relates to a planter and more particularly to a planter and a method for planting sentinel plants in a field.

BACKGROUND OF THE DISCLOSURE

Planters are generally used to plant plants in a field by delivering a seed from a hopper to the ground with a seed delivery system. Multi-variety planters can simultaneously plant seeds from two or more different plant genotypes in a single planting operation.

SUMMARY OF THE DISCLOSURE

In one embodiment, a planter configured for planting a sentinel plant in a field is disclosed. The planter comprises a first planting system that is coupled to the planter. The first planting system is configured for planting a first sentinel plant having a first sentinel plant characteristic. A global positioning system is communicatively coupled to the planter. The global positioning system is configured for generating a location signal indicative of a location of the planter. A control system is communicatively coupled to the planter. The control system is configured to receive the first sentinel plant characteristic, receive the location signal, receive a georeferenced field characteristic, and control the first planting system based on at least one of the first sentinel plant characteristic, the location, or the georeferenced field characteristic.

In another embodiment, a multi-variety planter configured for planting a sentinel plant in a field is disclosed. The multi-variety planter comprises a first planting system that is coupled to the multi-variety planter. The first planting system is configured for planting a first sentinel plant having a first sentinel plant characteristic. A second planting system is coupled to the multi-variety planter. The second planting system is configured for planting a second sentinel plant having a second sentinel plant characteristic. A global positioning system is communicatively coupled to the multi-variety planter. The global positioning system is configured for generating a location signal indicative of a location of the multi-variety planter. A control system is communicatively coupled to the multi-variety planter. The control system is configured to receive the first sentinel plant characteristic, receive the second sentinel plant characteristic, receive the location signal, receive a georeferenced field characteristic, and control at least one of the first planting system or the second planting system based on at least one of the first sentinel plant characteristic, the second sentinel plant characteristic, the location, or the georeferenced field characteristic.

In yet another embodiment, a method of controlling a planter for planting a sentinel plant in a field is disclosed. The method comprises receiving a first sentinel plant characteristic. Receiving a location signal indicative of a location of the planter. Receiving a georeferenced field characteristic. Controlling a first planting system to plant the first sentinel plant based on at least one of the first sentinel plant characteristic, the location, or the georeferenced field characteristic.

Other features and aspects will become apparent by consideration of the detailed description and accompanying drawings.

BRIEF DESCRIPTION OF THE DRAWINGS

FIGS. 3-6 are schematic side views of a portion of the row unit of FIG. 2 cycling through a series of positions;

FIGS. 7-10 are schematic side views of a planting assembly of the row unit of FIG. 2 cycling through a series of positions;

FIGS. 11-14 are schematic side views of a portion of the row unit of FIG. 2 cycling through a series of positions under alternate conditions;

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and/or C" or "one or more of A, B, and/or C" indicates the possibilities of only A, only B, only C, or any combination of two or more of A, B, and C (e.g., A and B; B and C; A and C; or A, B, and C).

DETAILED DESCRIPTION

Figure 1:
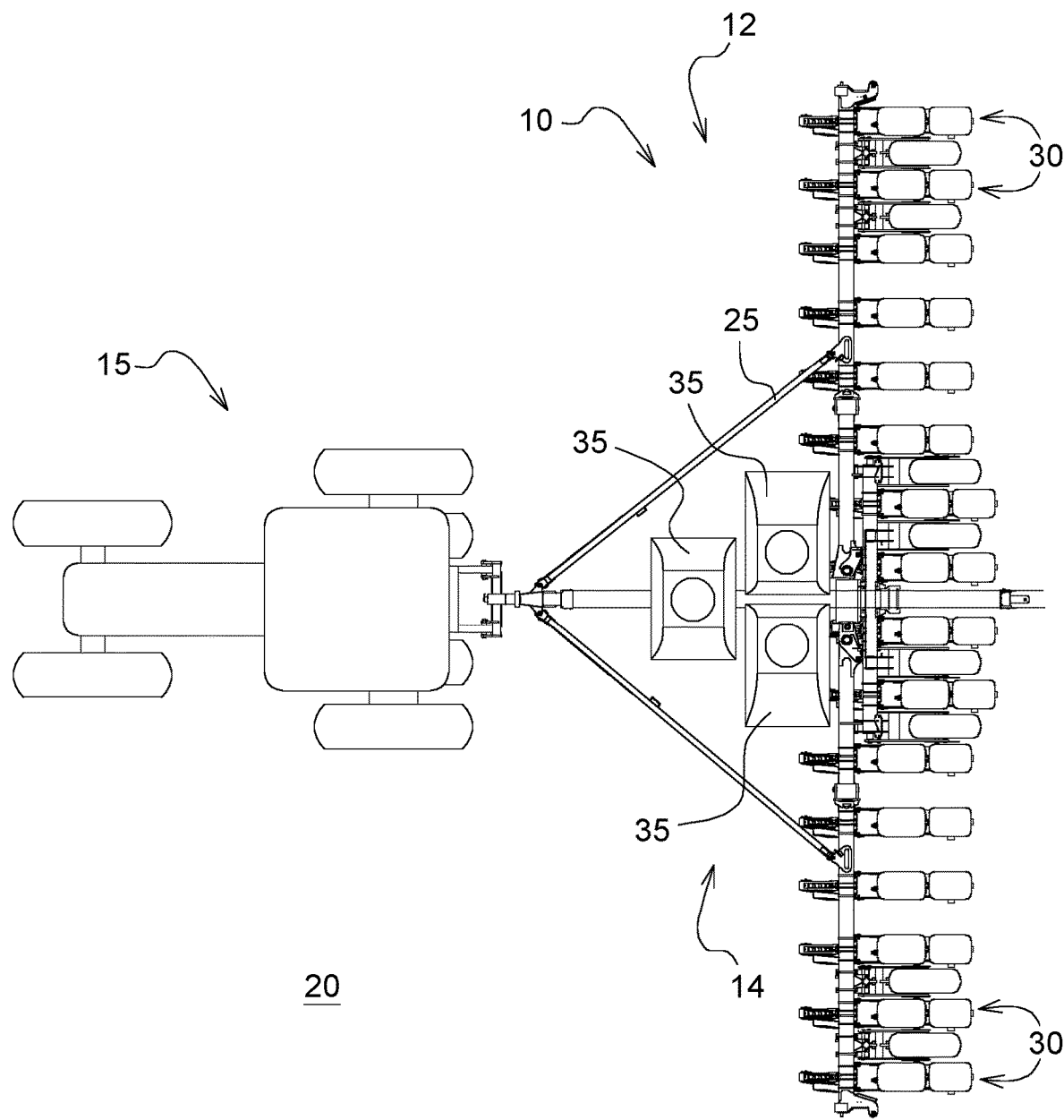
FIG. 1 is a top schematic view of a tractor and a planter having a plurality of row units.

FIG. 1 illustrates a planter 10 for planting plants 11 (FIG. 6) in seed form including sentinel seeds 65 (FIG. 6). The planter 10 may be a high-speed planter, an in-furrow planter, a multi-variety planter, a seedling planter, an air seeder, a broadcast seeder, or other type of planter. A first planting system 12 for planting one variety of plant 11 in the form of a seed may be coupled to the planter 10 or the planter 10 may be a multi-variety planter and also have a second planting system 14 for planting more than one variety of plant 11 in the form of a seed. The planter 10 for planting seeds is disclosed in commonly assigned U.S. patent application Ser. No. 17/107,041, the entire contents of which are hereby incorporated by reference. Other implementations of the first planting system 12 or the second planting system 14 for planting plants 11 in seedling form are contemplated by this disclosure such as that disclosed in commonly assigned U.S. patent application Ser. No. 16/511,918, the entire contents of which are hereby incorporated by reference.

Figure 2:
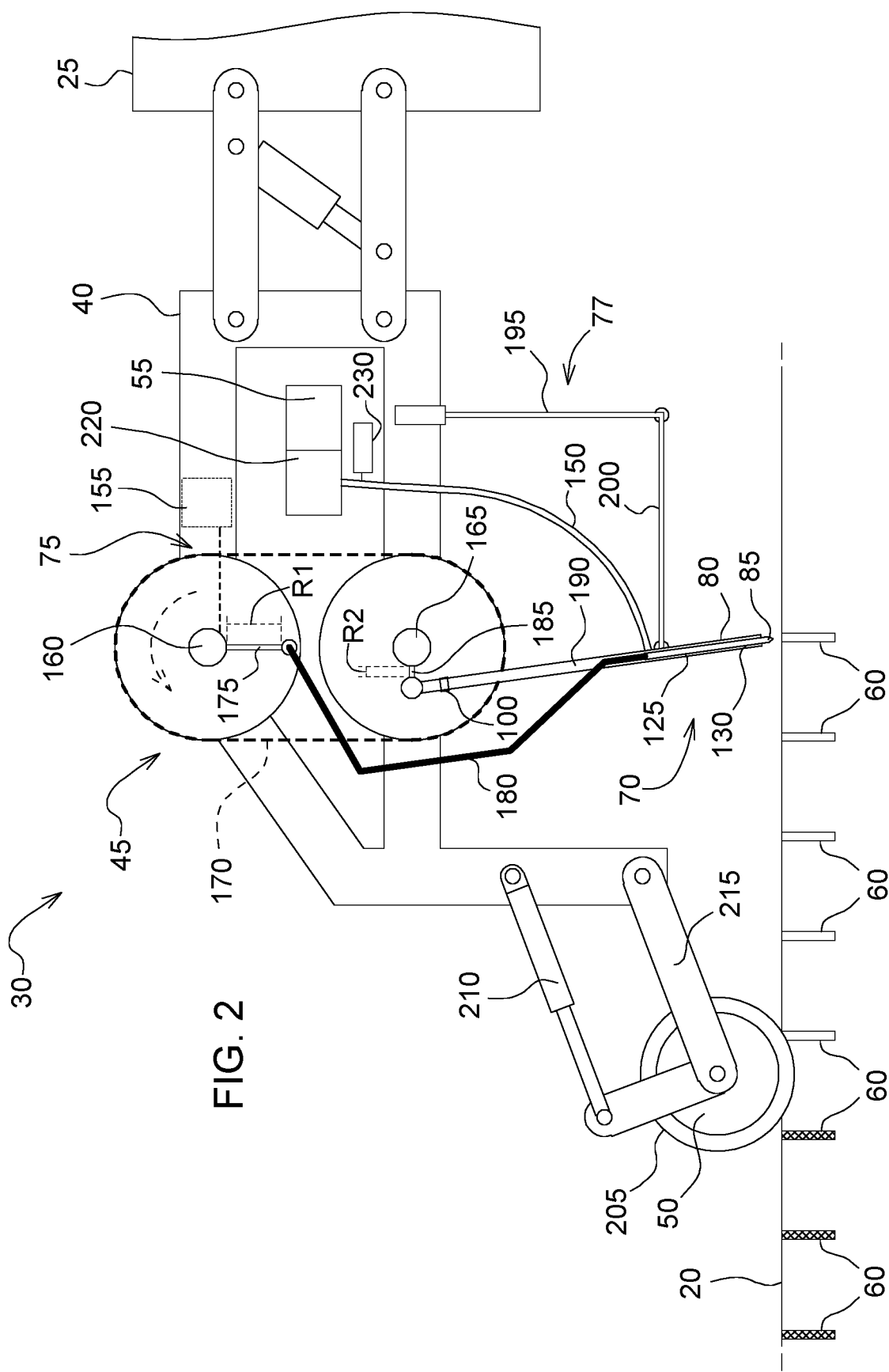
FIG. 2 is a side view of one of the plurality of row units of the planter of FIG. 1.

The illustrated planter 10 is selectively coupled to a vehicle 15, such as a tractor, to be pulled across a field 20 or ground (FIG. 2). The planter 10 includes a planter frame 25. The illustrated first planting system 12 and second planting system 14 each include at least one planting row unit 30 and at least one hopper 35 containing seeds to be planted, which are coupled to the planter frame 25. In some implementations the seeds are all the same while in other implementations, the seeds may be different by hopper 35 and may be planted differently by row or by location within a row. In other examples, without limitation, the planter frame 25 may be rigidly attached to a prime mover such as with a three-point hitch of vehicle 15 or planter frame 25 may be permanently integrated with vehicle 15.

With reference to FIG. 2, one of the plurality of row units 30 is shown in greater detail. The row units 30 may be identical to each other in some implementations but may have some differences in other implementations. Each row unit 30 is provided with a central frame member 40 supported on the planter frame 25 by downforce control actuators. The central frame member 40 is configured to support a seeding system 45, a press wheel 50, and a mini hopper 55. The seeding system 45 is operable to create a hole 60 in the field 20 or ground for receiving a sentinel seed 65 (FIG. 7) and to inject the sentinel seed 65 into the space. The press wheel 50 then fills in the space with dirt. The seeding system 45 is configured to create a plurality of the holes 60 in series, the holes 60 being discrete from each other. The discrete holes 60 are in contrast with other planters configured to create trenches. The seeding system 45 includes a planting assembly 70, a driving assembly 75, and a support assembly 77.

In the illustrated implementation, the row unit 30 includes a single seeding system 45. However, in some cases it may be desirable to include a second seeding system 45 on some or all of the row units 30. The second seeding system 45 would be mounted to the central frame member 40 in line with the first seeding system 45 (e.g., such that both seeding systems 45 are configured to plant a single row). The second seeding system 45 may include its own driving assembly 70 or may be connected to all or part of the driving assembly 70 of the first seeding system 45. In yet other implementations, each row unit 30 may include three or more seeding systems 45.

As best illustrated in FIGS. 7-10, the planting assembly 70 includes a seed guide 80 and a spike 85. The seed guide 80 is formed as a hollow tube 90 having a guide first end 95 and guide second end 100 (FIG. 3). The guide first end 95 is selectively disposed adjacent the ground 20 and the guide second end 100 is connected to the driving assembly 75. The hollow tube 90 includes a tube wall 105 having a seed aperture 110 disposed between the guide first end 95 and the guide second end 100. The seed aperture 110 may include a through-hole 115 disposed in the tube wall 105. The seed guide 80 includes a guide channel 120 (FIG. 10) extending through the hollow tube 90. The guide channel 120 may be formed as a through-hole defined by the tube wall 105. The spike 85 is formed as a shaft 125 (such that the terms "spike" and "shaft" may be used interchangeably herein) with a sidewall 130 extending between a spike first end 135 (FIG. 9) and a spike second end 140 (FIG. 3). The sidewall 130 is elongated and extends parallel to reciprocating movement of the spike 85. The spike first end 135 is tapered to a point 145 such that when inserted into the ground 20, the first end creates the hole 60 (which may also be referred to herein as a discrete hole 60), which may be tapered. The hole 60 may be a blind hole (such as a bore or a space or a pocket) in the ground 20 for receiving one of the sentinel seeds 65. The spike second end 140 is coupled to the driving assembly 75, as will be described in greater detail below. The spike 85 is slidably disposed within seed guide 80, such that the guide channel 120 receives the shaft 125. The spike 85 and seed guide 80 are both moveable independently with respect to the central frame member 40. The spike 85 is movable along a stroke path with respect to the seed guide 80. The spike 85 and the seed guide 80 are coaxial. In a first position (FIG. 7) along the stroke path, the spike first end 135 extends lower than the guide first end 95. In the first position, the seed aperture 110 is blocked by the spike 85 such that the seed aperture 110 is not in fluid communication with the guide channel 120 of the seed guide 80. In a second position (FIG. 9) along the stroke path, the spike first end 135 is disposed above the seed aperture 110 of the seed guide 80. In the second position, the seed aperture 110 is open (not blocked by the spike 85) such that the seed aperture 110 is in fluid communication with the guide channel 120 of the seed guide 80 (and ultimately in fluid communication with the hole 60 in the ground 20). The spike 85 is movable through the stroke path with respect to the seed guide 80 from the first position to the second position and back to the first position, and so on, in a reciprocating fashion as illustrated in FIGS. 7-10. The stroke path may also include, in addition to the reciprocating component towards and away from the ground 20, a rocking or tiling component, which will be described in greater detail below. (The terms "tilting" and "rocking" may be used interchangeably herein.) However, in some implementations, the stroke path may include only the reciprocating component.

A seed tube 150 and the seed guide 80 define the flow path that transports the sentinel seed 65 to the hole 60. The seeding system 45 is configured to retain the sentinel seed 65 outside of the stroke path of the spike 85 until the spike 85 retracts a predetermined distance. The predetermined distance may be met when the spike 85 retracts past the seed aperture 110. In some implementations, the predetermined distance may be met by other distances when the spike 85 retracts to other points along the stroke path.

With reference to FIG. 2, the driving assembly 75 includes a motor 155, a first crankshaft 160, and a second crankshaft 165. The second crankshaft 165 is operably connected to the first crankshaft 160 by a timing belt 170. The motor 155 may be directly coupled to the first crankshaft 160 or the second crankshaft 165 with the other driven by the timing belt 170. In some implementations, the first crankshaft 160 and second crankshaft 165 may extend the length of a single row unit 30 and drive one planting assembly 70. In other implementations, the first crankshaft 160 and second crankshaft 165 may extend across multiple row units 30 and drive multiple planting assemblies 70. The first crankshaft 160 is coupled to a first radial link 175 having a first length R1. In the illustrated implementation, the first radial link 175 may include an arm mounted on the first crankshaft 160. In other implementations, the first radial link 175 may include a post (not shown) mounted at a radius of R1 to a disc (not shown) mounted on the first crankshaft 160. Other linkages are also contemplated. The first radial link 175 is pivotally coupled to a first rigid link 180. The first rigid link 180 may be formed in a shape designed to avoid interference with other components of the row unit 30, as illustrated, or may be formed as a straight bar in other implementations. The first rigid link 180 is rotatably coupled to the spike second end 140 of the planting assembly 70. Similarly, the second crankshaft 165 is coupled to a second radial link 185 having a second length R2 which is pivotally coupled to a second rigid link 190. The second rigid link 190 is coupled to the guide second end 100 of the seed guide 80 of the planting assembly 70 such that the seed guide 80 is aligned coaxially with the second rigid link 190. In some implementations the seed guide 80 may be formed as a part of the second rigid link 190. In other implementations, the driving assembly 75 may have other configurations for driving the spike 85 and the seed guide 80, such as other arrangements of linkages coupled to a rotating shaft or shafts, or linear actuators (such as electric, pneumatic, or hydraulic linear actuators) may be employed. Other suitable mechanisms for driving the spike 85 and seed guide 80 are also contemplated.

The support assembly 77 supports the planting assembly 70 adjacent the ground 20. The planting assembly 70 is supported by the support assembly 77 such that the stroke path of the spike 85 is oriented such that the spike 85 reciprocates extending towards and retracting away from the ground 20 and the sidewall 130 extends parallel to the reciprocation direction of the spike 85. The support assembly 77 includes a flexible arm 195 extending generally vertically below the central frame member 40 and a support arm 200 coupled to a lower end of the flexible arm 195 and extending generally horizontally towards the planting assembly 70. (The term "generally" is used herein to encompass the ability to pivot, move, and/or flex from the main orientation as described below and to indicate that the main orientation need not be exact, just approximate.) The support arm 200 is coupled to the seed guide 80 of the planting assembly 70 and provides support to the planting assembly 70 and driving assembly 75 to inhibit undesired horizontal motion. The support arm 200 supports the seed guide 80 such that the seed guide 80 may reciprocate independently from the spike 85. The horizontal support arm 200 may be spring biased toward an intermediate position but may be able to extend or retract to allow the planting assembly 70 to deflect horizontally. The flexible arm 195 is formed from a material, such as a metal (such as steel, aluminum, or other metal), polymer, or composite (such as fiberglass), that is elastic enough to bend when a force is applied and resilient enough to return to the original form when the force is released. In other implementations, the support assembly 77 may include a single rigid bar coupling the seed guide 80 to the center frame member 40. In other implementations, the seed guide 80 is directly coupled to the central frame member 40 via a pin joint or other pivoting connection. In other implementations, the support assembly 77 may include a rigid vertical support link extending from the central frame member 40 and a horizontal support arm extending between the support link and the seed guide 80. The support assembly 77 may have other suitable configurations in other implementations.

The press wheel 50 includes an outer surface 205 and is configured to apply a downward force to the ground 20. The press wheel 50 is supported on the central frame member 40 by a depth control actuator 210. The depth control actuator 210 is actuatable to move the press wheel 50 vertically lower with respect to the central frame member 40 when the depth control actuator 210 is extended or vertically higher with respect to the central frame member 40 when the depth control actuator 210 is retracted. In the illustrated implementation, the press wheel 50 is supported on a linkage 215 that is rotated counterclockwise when the depth control actuator 210 is extended and clockwise when the depth control actuator 210 is retracted. Thus, the press wheel 50 has at least a component of vertical movement in response to actuation of the depth control actuator 210. The rotation of the linkage 215 causes the vertical displacement of the press wheel 50 with respect to the central frame member 40. The depth control actuator 210 may include a gas spring (not shown) controlled by gage wheels (not shown). In other implementations, the depth control actuator 210 may be pneumatically or hydraulically controlled. The press wheel 50 is rotated in response to a friction force between the ground 20 and the outer surface 205 when the planter 10 is moving. In other implementations, the press wheel 50 may be mounted to the central frame member 40 in other ways.

The central frame member 40 supports the mini hopper 55 adjacent the seeding system 45. The mini hopper 55 is connected to the one or more hoppers 35 and receives sentinel seed 65 therefrom. The central frame member 40 also supports a seed meter 220 such as is known in the art to provide a regulated flow of seeds. The seed meter 220 receives sentinel seeds 65 from the mini hopper 55, separates the sentinel seeds 65, and supplies metered sentinel seeds 65 to the seed tube (which may also be referred to herein as a seed conduit), one after another in substantially equal sequential intervals. In some implementations, the seed meter 220 may receive sentinel seeds 65 directly from one of the hoppers 35. The seed tube 150 may be pressurized by a pressure source 230 (e.g., a pump or other source of pressurized air) and is in fluid communication with the seed aperture 110 in the seed guide 80 (and thus fluidly connected to the guide channel 120 and to the hole 60 in the ground 20). For example, the seed guide 80 may support an end of the seed tube 150 extending at least partially into the seed aperture 110, or the seed tube 150 and the seed guide 80 may be coupled in any other suitable manner, e.g., using a connector between the seed tube 150 and the seed guide 80 in fluid communication with the seed aperture 110. The pressure may be constant or may be timed to match the operation of the driving assembly 75. In other implementations, the seed tube 150 need not be pressurized, e.g., the seed tube 150 may transport the seeds by gravity. In yet other implementations, the seed tube 150 may include a continuous loop belt for transporting the seeds to the seed guide 80. In yet other implementations, the seed tube 150 may include a mechanism to mechanically urge the seeds out of the seed tube 150. The seed tube 150 may form a first portion of a flow path configured to transport the seeds from the seed meter 220 towards the ground 20. The seed guide 80 may define a second portion of the flow path, as will be described in greater detail below.

With reference to FIGS. 3-6, in operation, the vehicle 15 is operated to move the planter 10 across the ground 20 in a first direction 235 and at a planter speed S1. Each seeding system 45 may be started simultaneously or at different times. When started, the motor 155 of the row unit 30 is activated in order to actuate the driving assembly 75. The activation of the motor 155 is separate from the movement of the planter 10. Because of this, a seeding speed S2 of the seeding system 45, as measured by the number of seeds planted per unit time, is independent from the planter speed S1, as measured by the distance traveled per unit time. The activated motor 155 rotates the first crankshaft 160 counterclockwise (as viewed in FIGS. 3-6). As the first crankshaft 160 rotates, the timing belt 170 transfers the motion to the second crankshaft 165, causing the second crankshaft 165 to rotate counterclockwise. The rotation of the first crankshaft 160 and second crankshaft 165 cause the driving assembly 75 to cycle through a plurality of stages. At the start of the cycle, shown in FIG. 3, the first radial link 175 is disposed pointing to the left of the first crankshaft 160 and the second radial link 185 is disposed pointing upward of the second crankshaft 165. The second rigid link 190 extends generally vertically from the second radial link 185 to the seed guide 80, which also is oriented generally vertically. The spike 85 is pivotally connected to the first rigid link 180 such that it follows the orientation of the seed guide 80. The spike 85 is disposed between the first position and the second position relative to the seed guide 80. Both the spike first end 135 and the guide first end 95 are disposed above the ground 20. As shown in FIG. 4, the movement of the first crankshaft 160 and second crankshaft 165 rotates the first radial link 175 and second radial link 185, respectively. The first radial link 175 is disposed downward of the first crankshaft 160, moving the first rigid link 180 and the spike 85 down as well. The second radial link 185 is disposed left of the second crankshaft 165, moving the second rigid link 190 and seed guide 80 down and tilting each toward the left (as illustrated in FIG. 4). The spike 85 is now in the first position relative to the seed guide 80. The spike 85 is in the ground 20 (meaning engaged with and displacing soil to create the hole 60) and the seed guide 80 is adjacent the ground 20. The cycle continues to FIG. 5 where the first radial link 175 points right and the second radial link 185 points down. The seed guide 80 is oriented generally vertically, and the spike 85 is disposed between the first and second positions. The seed guide 80 is now in the ground 20, further displacing soil to create the hole 60. In other words, the seed guide 80 is configured to penetrate the ground 20 to create a portion of the hole 60. The rotation continues to the stage shown in FIG. 6 and the first radial link 175 points upward and the second radial link 185 points left. The seed guide 80 and spike 85 are tilted to the right and the spike 85 is in the second position. The seed guide 80 is adjacent the ground 20. The cycle then continues with the first radial link 175 returning to the left of the first crankshaft 160 and the second radial link 185 returning to the top of the second crankshaft 165 as shown in FIG. 3. The resultant motion of the planting assembly 70 in response to the driving assembly 75 is that the seed guide 80 and the spike 85 reciprocate independently with respect to each other and with respect to the central frame member 40. In other words, the seed guide 80 is configured to reciprocate asynchronously with respect to the spike 85. In some portions of the resultant motion, the spike 85 retracts while the seed guide 80 extends (FIG. 8) and in other portions of the resultant motion, the spike 85 extends while the seed guide 80 retracts (FIG. 10).

The movement of the planting assembly 70 is shown in more detail in FIGS. 7-10. As the planter 10 travels along the row in the first direction 235 and the driving assembly 75 operates the spike 85 and seed guide 80 both move toward the ground 20, as shown in FIG. 7. As the spike 85 pierces the ground 20, the tapered point 145 displaces the soil with minimal force. The spike 85 is tilted away from the first direction 235 as it pierces the ground 20, meaning the spike first end 135 is further in the first direction 235 than the spike second end 140. At this time a sentinel seed 65 from the mini hopper 55 has been supplied to the seed tube 150 by the seed meter 220 and travels down toward the planting assembly 70. As shown in FIG. 8, once the spike 85 has reached a maximum extension, it begins to move back toward the central frame member 40, leaving the hole 60 in the ground 20. The maximum extension is determined by the length R1 of the first radial link 175. A larger length R1 creates a maximum extension that extends deeper into the ground 20. The spike 85 is still tilted away from the first direction 235 as it travels out of the ground 20. The seed guide 80 continues to move downward toward a maximum extension and into the ground 20, displacing the soil further, still with minimal force required. The maximum extension of the seed guide 80 is determined by the length R2 of the second radial link 185, in a similar manner to the maximum extension of the spike 85. In other words, the maximum extension of the seed guide 80 defines an extended position for engaging the ground 20. At this point, the sentinel seed 65 is disposed adjacent the seed aperture 110 and is inhibited from entering the guide channel 120 by the sidewall 130 of the spike 85, the sidewall 130 acting as a barrier between the sentinel seed 65 and the hole 60. As shown in FIG. 9, the spike 85 retracts, e.g., follows the stroke path away from the ground 20. As the spike 85 retracts past the seed aperture 110, gravity and the pressure from the seed tube 150 pushes the sentinel seed 65 into the guide channel 120 of the seed guide 80. In some implementations, gravity may push the sentinel seed 65 into the guide channel 120 without the use of pressure. The spike 85 and the seed guide 80 are configured such that the sentinel seed 65 is blown past the spike 85 upon retraction of the spike past the seed aperture 110. The seed aperture 110 is disposed outside of the stroke path of the spike 85 as the seed aperture 110 is disposed in the tube wall 105 of the seed guide 80. In other words, the spike 85 does not enter the seed aperture 110.

The point 145 of the spike 85 is configured to not contact the sentinel seed 65 during shaft extension. However, the sidewall 130 may contact the sentinel seed 65 to block the sentinel seed 65, as described above, in some instances. The spike 85 is configured to not push the sentinel seed 65 into the ground 20. In some implementations, the spike 85 does not include a channel for transporting the sentinel seed 65 through the spike 85; rather, the sentinel seed 65 is transported past the spike 85. Damage to the sentinel seed 65 in inhibited by reducing contact between the spike 85 and the sentinel seed 65.

As shown in FIG. 10, the seed guide 80 has begun to move back toward the central frame member 40, tilted toward the first direction 235, having widened the hole 60, however the guide first end 95 is still in the ground 20. The sentinel seed 65, therefore, has followed the guide channel 120 down into the hole 60. Misplacement and damage of the sentinel seed 65 is inhibited by injecting the sentinel seed 65 when the guide first end 95 is still in the ground 20. As shown in FIG. 10, as the seed guide 80 moves toward the central frame member 40, away from the ground 20, the spike 85 begins to move back toward the ground 20, and the planting assembly 70 begins to tilt away from the first direction 235 once more. Because of the tilting of the planting assembly 70, the resultant hole 60 is minimally elongated in the first direction 235. The process repeats to create further holes 60 in series in the first direction 235. The planting assembly 45 is configured to create one hole 60 on each stroke.

The press wheel 50 (FIG. 2) follows the planting unit and applies a force that redistributes the soil, filling in the holes 60. The operation leaves a series of loose soil spots, in contrast to the loose trenches created by typical furrow disks. The press wheel 50 may be supported at different distances from the central frame member 40 in order to create different planting heights. The position of the press wheel 50 may be adjusted by actuating the depth control actuator 210 through the associated gage wheels. Extending the depth control actuator 210 lowers the press wheel 50 toward the ground 20, creating a shallower planting depth, and retracting the depth control actuator 210 raises the press wheel 50 away from the ground 20, creating a deeper planting depth.

In certain cases, the ground 20 is not uniform. For example, there may be rocks or hard spots embedded in the ground 20. As the spike 85 punches into the ground 20, it may run into the hard spot. To inhibit damage to the seeding system 45 and to reduce disruptions to the operation, the force of the rock R is deflected through the flexible arm 195. As illustrated in FIGS. 11-14, when the spike 85 hits a hard spot, the flexible arm 195 may bend allowing the downward force provided by the driving assembly 75 to continue and the planting assembly 70 to move. In the illustrated implementation the flexible arm 195 bends such that a lower end of the flexible arm 195 moves away from the first direction 235 and the planting assembly 70 is horizontally displaced away from the first direction 235. However, the flexible arm 195 and the planting assembly 70 may also deflect toward the first direction 235. The direction of deflection of the flexible arm 195 and the planting assembly 70 may be based on the geometry of the hard spot and the reaction forces within the planting assembly 70.

The planter design as described above requires less down force than typical furrowing discs. Because the planter 10 has to support less down force, the central frame member 40 can be made of lighter materials. The seeding system 45 design also makes it easy to synchronize the seeding across the rows, making it easy to create a grid planted field. The holes created by the seeding system 45 are relatively small and therefore create less loose soil which makes erosion and subsequent seed loss less likely. Additionally, the driving assembly 75 is driven independently of the motion of the planter 10. This allows seeding speed S2 to be varied independently of the planter speed S1, allowing for more precise seeding. The small profile of the seeding system 45 and the holes created by the seeding system 45 allows for less distance between row units 30 and therefore less distance between rows. Thus, more rows can be planted.

The planter 10 is operable to simultaneously plant seeds of two or more different plant genotypes in a single planting operation, or in a single pass of the planter 10 through the field 20. Specifically, the hoppers 35 may each be filled with different seeds of different plant genotypes. Seeds of different plant "genotypes" can include without limitation seeds of different plant varieties, of different plant cultivars, of different plant hybrids, of different plant species, or of different plant characteristics. The different seeds may be distributed to different row units 30 of the planter 10, or to different seeding systems 45 of a single row unit 30, or different seeds may be selectively supplied to a single seeding system 45, as will be further described below. As such, the planter 10 can be utilized to practice intercropping, a multiple cropping practice where two or more crops are grown in proximity. Intercrops may include a first crop, or cash crop, of a first plant type to be harvested, and may further include one or more cover crops of different plant types that are planted between rows of the cash crop or amongst the cash crop. The one or more cover crops can be selected to manage attributes of the soil, such as soil erosion, soil fertility, soil quality, water, weeds, pests, diseases, biodiversity, wildlife, and other attributes.

Figure 15:
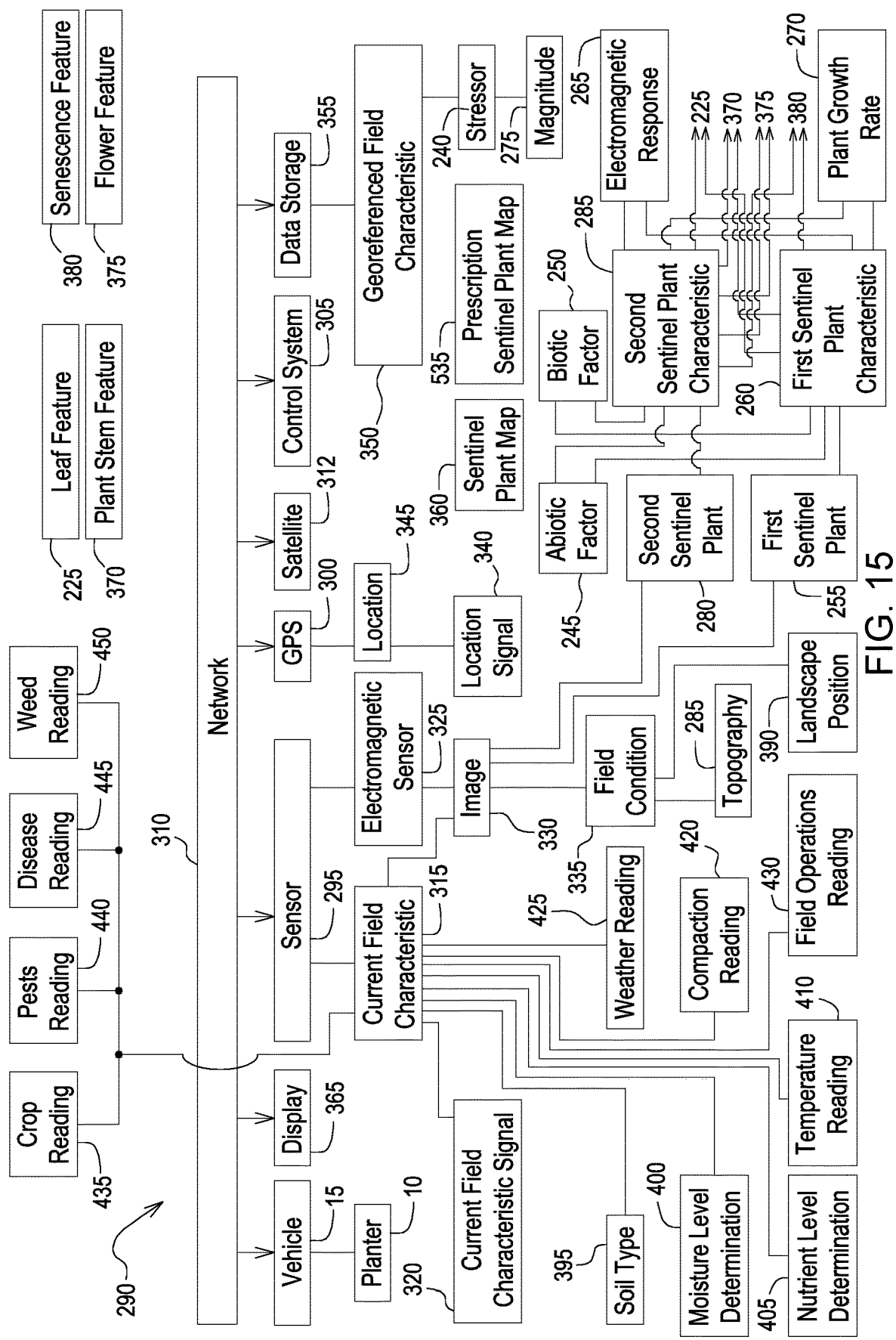
FIG. 15 is a block diagram of a planter.

Additionally, the planter 10 may be used to plant sentinel seeds 65 and other seeds in proximity of, or near, the sentinel seeds 65. Sentinel seeds 65 exhibit different characteristics when presented with a stressor 240 (FIG. 15). With continued reference to FIG. 15, the different characteristics can be any detectable plant attribute that is proportional to the stressor 240 such as an abiotic factor 245 or a biotic factor 250. For example, the abiotic factor 245 may be a lack of or an abundance of water, humidity, light or minerals. The abiotic factor 245 may also be soil conditions or temperature. The biotic factor 250 may be the presence of a certain fungus, bacteria, or insect.

For example, the sentinel seeds 65 may be genetically modified corn or soy beans that exhibit different characteristics from the other corn or soy beans that the sentinel seeds 65 are planted with, respectively. In other examples, the seed may be traditionally bred. The first planting system 12 may be configured for planting a first sentinel plant 255 that exhibits a first sentinel plant characteristic 260. The first sentinel plant 255 may be a sentinel seed 65 or a sentinel seedling (not shown) or any other sentinel plant form. The first sentinel plant 255 may also be a fungus, a lichen, mold, or any other stationary life form. The second planting system 14 may be configured for planting a second sentinel plant 280 that exhibits a second sentinel plant characteristic 285. The second sentinel plant characteristic 285 may be the same as the first sentinel plant characteristic 260 or it may vary. The second sentinel plant 280 may be a sentinel seed 65 or a sentinel seedling (not shown) or any other sentinel plant form. The second sentinel plant 280 may also be a fungus, a lichen, mold, or any other stationary life form.

In one embodiment, the first or second sentinel plant characteristic 260, 285 may include at least one of varying intensity of electromagnetic response 265 generated by the first or second sentinel plant 255, 280 or a plant growth rate 270 that correspond to a magnitude 275 of the stressor 240. The electromagnetic response 265 may be an absorption, transmission, backscatter, reflectance, fluorescence, bioluminescence, or other. The electromagnetic response 265 may be induced with or without external stimulation.

In another embodiment, the first or second sentinel plant characteristic 260, 285 may include a change in a leaf feature 225 such as a change in leaf size, color, color pattern, shape, area index, or temperature. Other leaf features 225 are contemplated by this disclosure.

In yet another embodiment, the first or second sentinel plant characteristic 260, 285 may include a change in a plant stem feature 370 such as a change in plant stem height, plant stem biomass, plant stem formations or malformations, plant stem diameter, plant stem color, or plant stem color pattern. Other plant stem features 370 are contemplated by this disclosure.

The first or second sentinel plant characteristic 260, 285 may include the slow plant growth rate 270 or otherwise altered growth rate, or a time to emergence, seed germination rate, or an initiation of reproductive phase.

In another embodiment, the first or second sentinel plant characteristic 260, 285 may include a change in a flower feature 375 such as flower color or flower timing. Other flower features 375 are contemplated by this disclosure.

In yet another embodiment, the first or second sentinel plant characteristic 260, 285 may include a senescence feature 380 such as death of the sentinel plant due to daylight, a daylight change derivative, a change in temperature, a soil chemical attribute, or other. Other first or second sentinel plant characteristics 260, 285 are contemplated by this disclosure.

Referring to FIG. 15, a block diagram is provided of one example of a computing architecture 290 that includes planter 10, a sensor 295, a global positioning system ("GPS") 300, and a control system 305. Global positioning system 300 may comprise a Global Navigation Satellite System (GNSS), a terrestrial radio triangulation system, or any other system which is able to provide the location of the planter 10 in the field 20 in global or local coordinates. FIG. 15 illustratively shows that the planter 10, the sensor 295, the GPS 300, and the control system 305 are connected over a network 310. Thus, computing architecture 290 operates in a networked environment, where the network 310 includes any of a wide variety of different logical connections such as a local area network (LAN), wide area network (WAN), controller area network (CAN) near field communication network, satellite communication network, cellular networks, or a wide variety of other networks or combination of networks. It is also noted that the control system 305 can be deployed on the planter 10 such that the control system 305 performs the operations described herein without a networked connection. In addition, while the present description will primarily focus on an example of the control system 305 communicating with the planter 10, it is noted that the same or similar functionality can be provided when communicating with a wide variety of vehicles 15 and/or remote systems.

The sensor 295 may be communicatively coupled to the planter 10. For example, the sensor 295 may be coupled to the planter 10 or it may be coupled to a satellite 312 that communicates with the planter 10 or control system 305. The sensor 295 may be configured for sensing a current field characteristic 315 and generating a current field characteristic signal 320 indicative of the current field characteristic 315 that can be used to determine where to plant the sentinel seeds 65. The sensor 295 may include an electromagnetic sensor 325 (e.g., optical sensor) and the current field characteristic 315 may include an image 330 that depicts a field condition 335. The image 330 may be 2D or 3D. The image 330 may comprise a single pixel or data value. The electromagnetic sensor 325 may be a camera or other imaging sensor such as a video camera. Alternatively, the sensor 295 may include at least one of a radar, lidar, laser-based sensors, LIDAR based sensors, temperature sensors, soil property sensors, and a wide variety of other imaging or other sensing systems.

The current field characteristic 315 may include an image 330 that depicts the field condition 335 such as a topography 385 of the field 20 or landscape position 390 of plants 11 or a size of the plant 11 patches. The current field characteristic 315 may also include soil type 395 such as clay composition or top soil composition. The current field characteristic 315 may include a moisture level determination 400 such as 20-80% water content or a nutrient level determination 405 that includes a level of soil organic matter, or residue cover, or cover crops. Additionally, the current field characteristic 315 may include a temperature reading 410 of the field 20 at a soil depth or a pH reading 415 of the soil of the field 20.

The current field characteristic 315 may include a compaction reading 420 of the field 20 that includes compaction layer details such as depth of the compaction and compaction drainage and its location in the field 20. Additionally, the current field characteristic 315 may include a weather reading 425. The weather reading 425 may include past, present, and future temperatures, moisture, solar, sun angle, sunlight attenuation by clouds or other, day length, or other.

The current field characteristic 315 may include a field operations reading 430 that indicates machinery data including machinery settings or timing of machinery operations along with the location in the field 20. Additionally, the current field characteristic 315 may include a crop reading 435 that indicates crop details including mono or multiple varieties that are planted in the field 20 and their location. The current field characteristic 315 may include a pests reading 440 including an indication of any insects, mammals, birds, or other similar biotic factors and their location in the field 20. The current field characteristic 315 may include a disease reading 445 including an indication of any bacteria, molds, smuts, viruses or other similar biotic factors and their location in the field. The current field characteristic 315 may include a weed reading 450 including an indication of any weeds and weed seeds and their location in the field 20. Other current field characteristics 315 are contemplated by this disclosure.

The GPS 300 is communicatively coupled to the planter 10. The GPS 300 is configured for generating a location signal 340 indicative of a location 345 of the planter 10 or vehicle 15. Generally, the GPS 300 receives sensor signals from one or more sensors, such as a GPS receiver, a dead reckoning system, a LORAN system, or a wide variety of other systems or sensors, to determine the location 345 of the planter 10 across the field 20.

The control system 305 is in communication with the sensor 295 and the GPS 300. The control system 305 is communicatively coupled to the planter 10. The control system 305 may be configured to receive the first sentinel plant characteristic 260, receive the second sentinel plant characteristic 285, receive the location signal 340, receive a georeferenced field characteristic 350 from a data storage 355, and control at least one of the first planting system 12 or the second planting system 14 based on at least one of the first sentinel plant characteristic 260, the second sentinel plant characteristic 285, the location 345, the current field characteristic 315, or the georeferenced field characteristic 350, or any combination thereof. The georeferenced field characteristic 350 may include a depth and spacing information for the plants 11 from a prior planting operation or historical data for the field 20. The georeferenced field characteristic 350 may include relationships between first and second sentinel plant characteristics 260, 285 that can be sensed and the georeferenced field characteristics 350 that promote a degree of response.

The control system 305 may be configured to control the first planting system 12 to plant the first sentinel plant 255 at the location where the georeferenced field characteristic 350 indicates the stressor 240 for the first sentinel plant characteristic 260. For example, the georeferenced field characteristic 350 may indicate an area or location of the field 20 where there is or may be a high incidence of an insect. The control system 305 may control the first planting system 12 to plant the first sentinel plant 255 that has the first sentinel plant characteristic 260 that is elicited by the insect at this location. The first sentinel plant characteristic 260 may be the slow growth rate 270.

In an additional example, the georeferenced field characteristic 350 may indicate an area of the field 20 where there is a high probability of soybean chlorosis in some years. The control system 305 may control the first planting system 12 to plant the first sentinel plant 255 that has the first sentinel plant characteristic 260 that is elicited by difficulties in plant uptake of iron, resulting in chlorosis, at this location. The first sentinel plant characteristic 260 may be a yellowing of leaves proportional to the severity of the stress. Mitigation could be to apply chelated iron and maybe sulfur with the planter 10, the vehicle 15, or other equipment.

The georeferenced field characteristic 350 may include a sentinel plant map 360 and the control system 305 may be configured to update the sentinel plant map 360 and the georeferenced field characteristic 350 in the data storage 355 with the current field characteristic 315. The sensor 295 may be used to obtain the data stored in the data storage 355. The data storage 355 may be coupled to the planter 10, the work vehicle 15, or the satellite 312. In some examples, satellite 312 may comprise a manned aircraft or unmanned aerial vehicle as a remote sensor platform.

A display 365 may be provided for displaying the sentinel plant map 360 to an operator. Additionally, the operator may enter planter 10 or vehicle 15 commands via the display 365. Display 365 may include audio elements such as a speaker or microphone. Display may include haptic elements such as a vibration generator.

Figure 16:
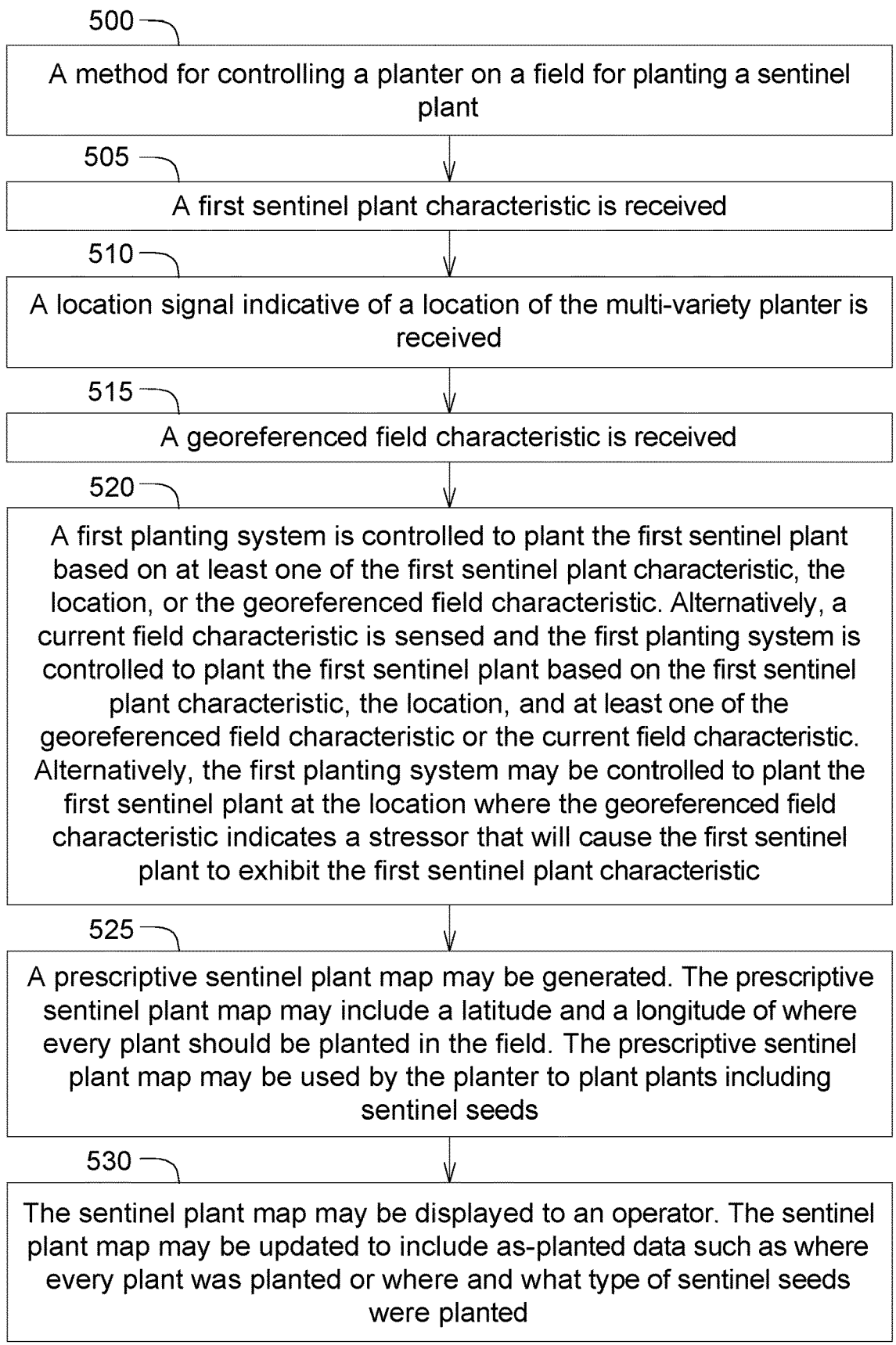
FIG. 16 is a flow diagram of a method for operating a planter in a field.

Referring now to FIG. 16, a flow diagram of a method 500 for controlling a planter 10 on a field 20 for planting a sentinel plant 11 is provided. At 505, a first sentinel plant characteristic 260 is received. At 510, a location signal 340 indicative of a location 345 of the multi-variety planter 10 is received. At 515, a georeferenced field characteristic 350 is received.

At 520, a first planting system 12 is controlled to plant the first sentinel plant 255 based on at least one of the first sentinel plant characteristic 260, the location 345, or the georeferenced field characteristic 350. Alternatively, a current field characteristic 315 is sensed and the first planting system 12 is controlled to plant the first sentinel plant 255 based on the first sentinel plant characteristic 260, the location 345, and at least one of the georeferenced field characteristic 350 or the current field characteristic 315. Alternatively, the first planting system 12 may be controlled to plant the first sentinel plant 255 at the location where the georeferenced field characteristic 350 indicates a stressor 240 that may or will cause the first sentinel plant 255 to exhibit the first sentinel plant characteristic 260. In other examples, the first planting system 12 may be controlled to plant the first sentinel plant 255 at a location which is part of a geographic pattern such as a grid, an elevation gradient, a transect, or other geospacially-dependent scheme.

At 525, a prescriptive sentinel plant map 535 may be generated. The prescriptive sentinel plant map 535 may include a latitude, a longitude, and a depth of where every plant 11 should be planted in the field 20. The prescriptive sentinel plant map 535 may be used by the planter 10 to plant plants 11 including sentinel seeds 65.

At 530, the sentinel plant map 360 may be displayed to an operator. The sentinel plant map 360 may be updated to include as-planted data such as where every plant 11 was planted or where and what type of sentinel seeds 65 were planted.

Advantageously, sentinel seeds 65 would not need to be planted at the same time as the main crop. They could be planted at the time of spring tillage ahead of the crop planting pass. They could also be planted after the main crop. In one example, a problem is otherwise identified in the field 20 and then sentinel seeds 65 are planted to play a diagnostic role to find out why the stand is poor or lagging. In another example, sentinel seeds 65 could be planted just prior to a critical crop phase such as pollination to provide data on conditions during a window. Sentinel seeds 65 could also be perennials planted once for multiple seasons of use for annual crops or multi-year crops like cane sugar.

Sentinel seeds 65 could be an organism, other than plants 11, such as bacteria or fungi (some soil fungi in the tropics are naturally fluorescent). The response of the sentinel organisms could be detected by sensors 295 on a ground engaging element such as a shank. Similarly, the response to a stressor 240 by a sentinel seed 65 may be in the roots and observed below ground.

Sentinel seeds 65 could depend on allelopathy. A first plant, micro, fungi could be the one which is proportionally responsive to the stressor 240. The response may be in the form of proportionally altering the environment around a second plant. The second plant then communicates the level of that alternate environment. For example, in response to a soil condition, a microbe alters the pH of the soil adjacent to it. This causes a color change in the flower of a co-located plant sensitive to soil pH. A liquid may be precisely applied in the seed trench and planting a sentinel seed 65 may comprise placing a seed and inoculating the soil near the seed with bacteria, fungi, etc. The inoculant wouldn't even need to be alive. It could be the first plant is replaced by a chemical that reacts with one or more soil components, living or non-living, that results in a proportional amount that is reported via the second plant. Chemical may be applied as a liquid, solid, or gas. Also note that the reporter plant response can be other things besides fluorescence such as a nitrogen level experienced by a microbe, a local soil pH level, or a plant flower or leaf color.

Machine learning may be used to improve the efficacy of where to plant plants 11 including sentinel seeds 65. The ability of the sentinel plants to accurately sense desired crop conditions, in some cases compared to laboratory analysis or other sensing means, may be improved with machine learning. This improvement could be in the selection of varieties to use as sentinels, planting attributes (e.g., interplant spacing, depth), or location of individual plants 11 or plant 11 patches.

What is claimed is:

1. A planter configured for planting a sentinel plant in a field, the planter comprising:
    a first planting system coupled to the planter, the first planting system configured for planting a first sentinel plant having a first sentinel plant characteristic;
    a global positioning system communicatively coupled to the planter, the global positioning system configured for generating a location signal indicative of a location of the planter;
    a data storage for storing a georeferenced field characteristic, the georeferenced field characteristic including historical data for the field;
    a sensor communicatively coupled to the planter, the sensor configured for sensing a current field characteristic and generating a current field characteristic signal indicative of the current field characteristic; and
    a control system communicatively coupled to the planter, the control system configured to:
        receive the first sentinel plant characteristic,
        receive the location signal indicative of the location of the planter,
        receive the georeferenced field characteristic,
        receive the current field characteristic, and
        control the first planting system based on the first sentinel plant characteristic, the location, and at least one of the georeferenced field characteristic and the current field characteristic to plant the first sentinel plant at the location that includes a stressor that elicits the first sentinel plant characteristic.

2. The planter of claim 1, further comprising a second planting system coupled to the planter, the second planting system configured for planting a second sentinel plant having a second sentinel plant characteristic, the control system configured to receive the second sentinel plant characteristic, control at least one of the first planting system or the second planting system based on at least one of the first sentinel plant characteristic, the second sentinel plant characteristic, the location, and at least one of the georeferenced field characteristic and the current field characteristic to plant the first sentinel plant or the second sentinel plant at the location that includes a stressor that elicits the first sentinel plant characteristic or the second sentinel plant characteristic.

3. The planter of claim 1, wherein the georeferenced field characteristic comprises a sentinel plant map and the control system is configured to update the sentinel plant map with the current field characteristic.

4. The planter of claim 3, further comprising a display for displaying the sentinel plant map to an operator.

5. The planter of claim 1, wherein the first sentinel plant characteristic comprises at least one of varying intensities of electromagnetic response generated by a sentinel plant or a plant growth rate that correspond to a pressure of the stressor.

6. A multi-variety planter configured for planting a sentinel plant in a field, the multi-variety planter comprising:
- a first planting system coupled to the multi-variety planter, the first planting system configured for planting a first sentinel plant having a first sentinel plant characteristic;
- a second planting system coupled to the multi-variety planter, the second planting system configured for planting a second sentinel plant having a second sentinel plant characteristic;
- a global positioning system communicatively coupled to the multi-variety planter, the global positioning system configured for generating a location signal indicative of a location of the multi-variety planter;
- a data storage for storing a georeferenced field characteristic, the georeferenced field characteristic includes historical data for the field;
- a sensor communicatively coupled to the planter, the sensor configured for sensing a current field characteristic and generating a current field characteristic signal indicative of the current field characteristic; and
- a control system communicatively coupled to the multi-variety planter, the control system configured to:
  - receive the first sentinel plant characteristic,
  - receive the second sentinel plant characteristic,
  - receive the location signal indicative of the location of the planter,
  - receive the georeferenced field characteristic,
  - receive the current field characteristic; and
  - control at least one of the first planting system or the second planting system based on the first sentinel plant characteristic, the second sentinel plant characteristic, the location, and at least one of the georeferenced field characteristic and the current field characteristic to plant the first sentinel plant or the second sentinel plant at the location that includes a stressor that elicits the first sentinel plant characteristic or the second sentinel plant characteristic.

7. The multi-variety planter of claim 6, wherein the sensor comprises an electromagnetic sensor, the current field characteristic comprises an image that depicts a field condition.

8. The multi-variety planter of claim 6, wherein the georeferenced field characteristic comprises a sentinel plant map and the control system is configured to update the sentinel plant map with the current field characteristic.

9. The multi-variety planter of claim 8, further comprising a display for displaying the sentinel plant map to an operator.

10. The multi-variety planter of claim 6, wherein the first sentinel plant characteristic comprises at least one of varying intensities of electromagnetic response generated by a sentinel plant or a plant growth rate that correspond to a pressure of the stressor.

11. The multi-variety planter of claim 10, wherein the stressor comprises at least one of an abiotic factor or a biotic factor.

12. A method of controlling a planter for planting a sentinel plant in a field, the method comprising:
- receiving a first sentinel plant characteristic;
- receiving a location signal indicative of a location of the planter;
- receiving a georeferenced field characteristic from a data storage, the georeferenced field characteristic including historical data for the field;
- receiving a current field characteristic; and
- controlling a first planting system to plant the first sentinel plant based on the first sentinel plant characteristic, the location, and at least one of the georeferenced field characteristic and the current field characteristic to plant the sentinel plant at the location that includes a stressor that elicits the first sentinel plant characteristic.

13. The method of claim 12, wherein the first sentinel plant characteristic comprises at least one of varying intensities of electromagnetic response generated by a sentinel plant or a plant growth rate that correspond to a pressure of the stressor.

14. The method of claim 12, further comprising displaying a sentinel plant map to an operator.

* * * * *